April 30, 1929.  W. J. GOURIE  1,711,053
STORAGE BIN
Filed Oct. 5, 1927  4 Sheets-Sheet 3
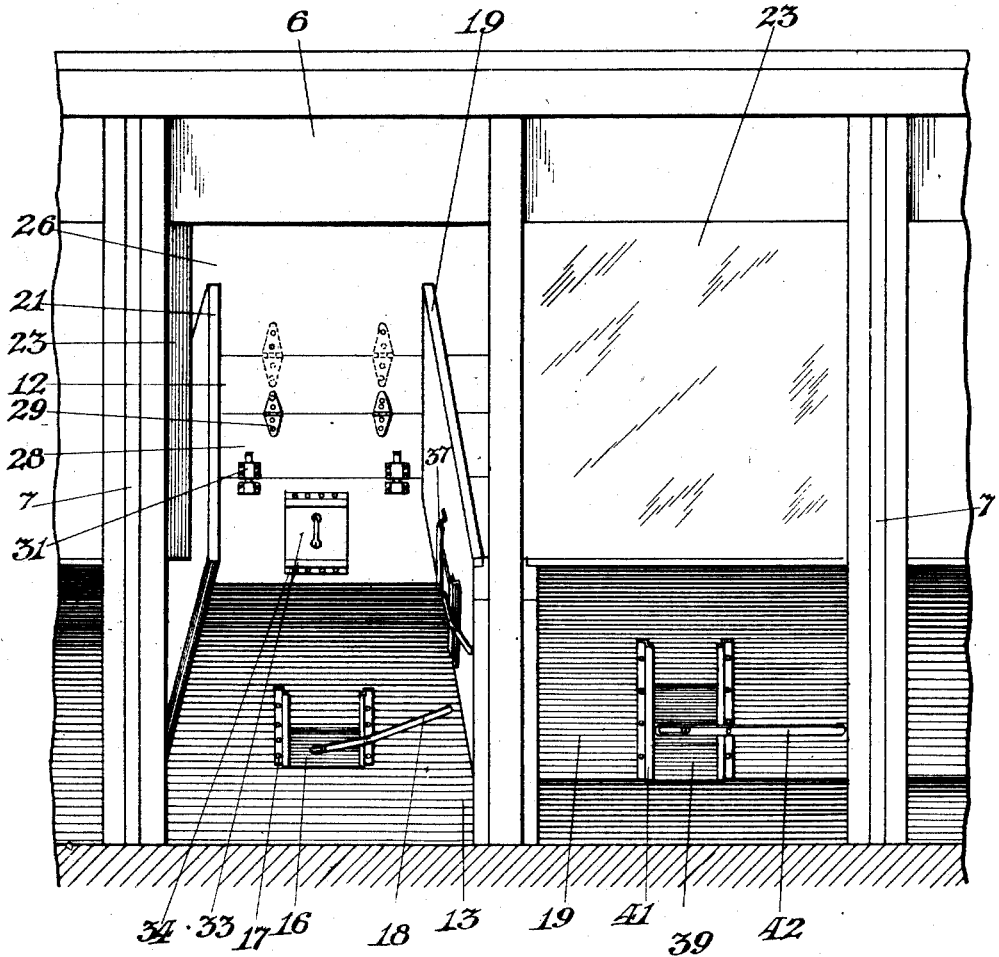
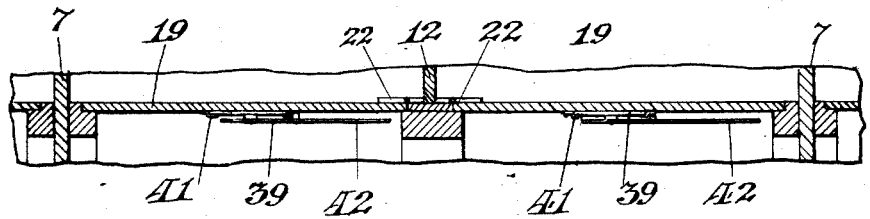
WITNESSES:
Harry C. Bright.
INVENTOR
William Gourie,
BY Joshua R. H. Potts
ATTORNEY

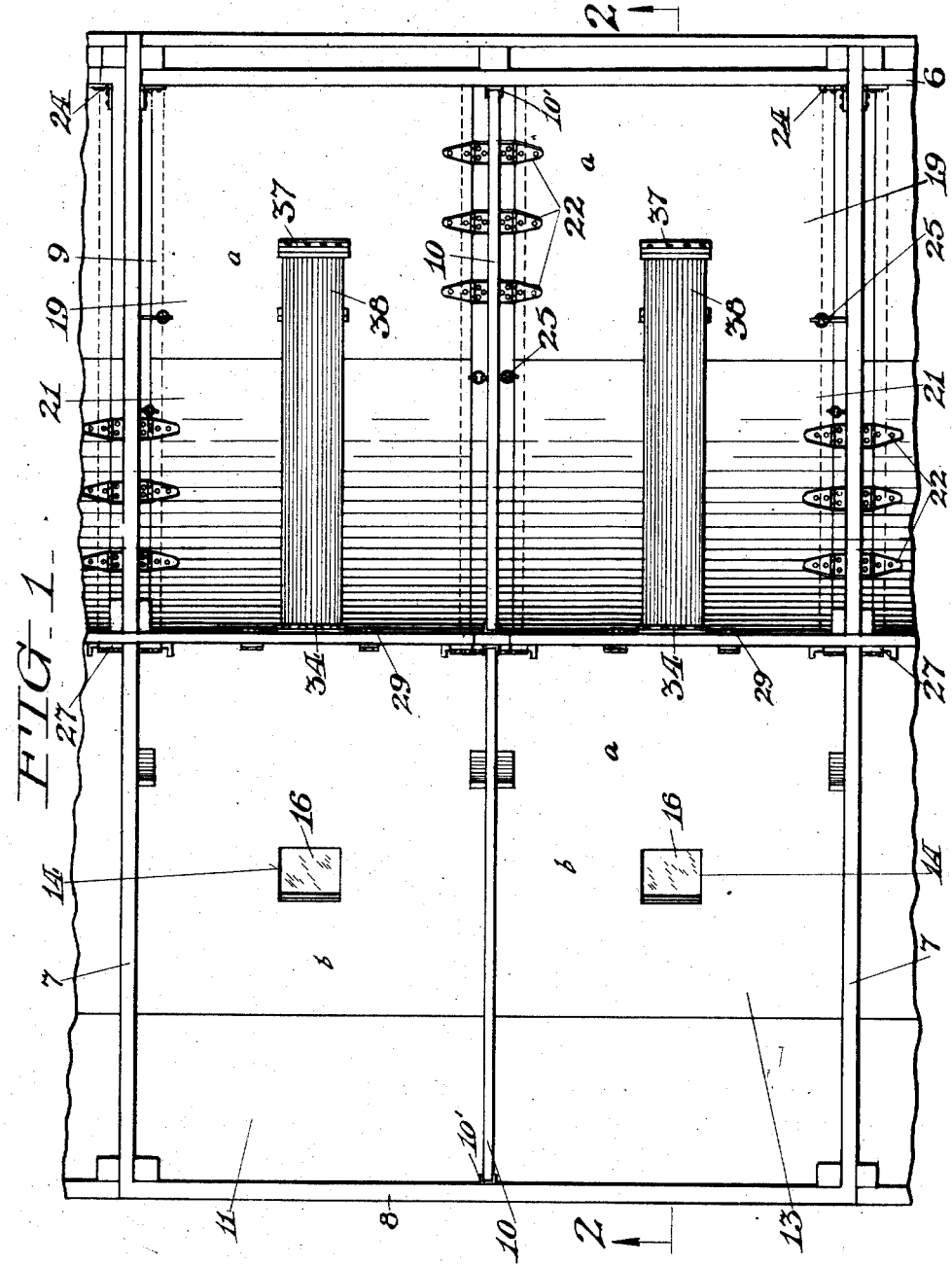

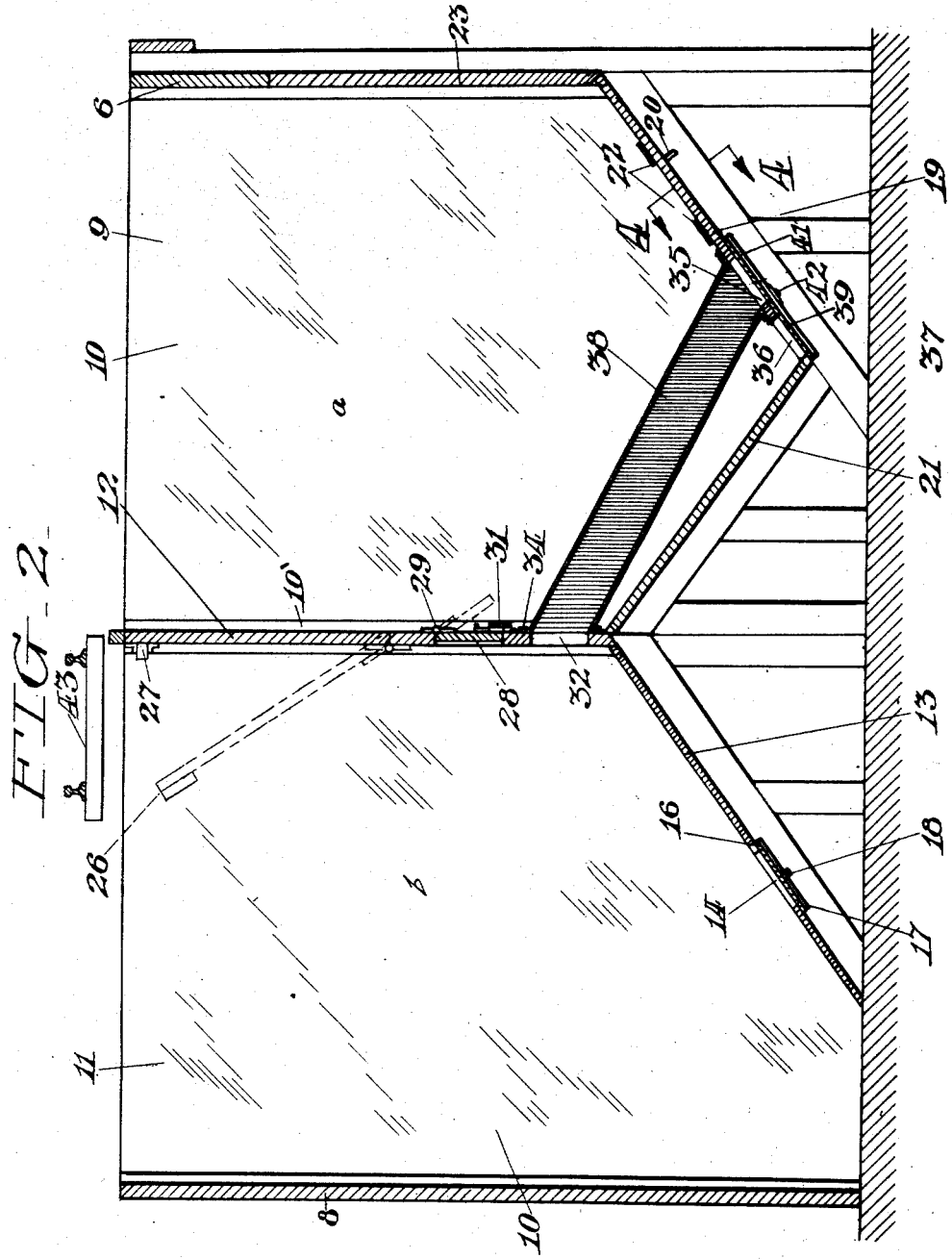

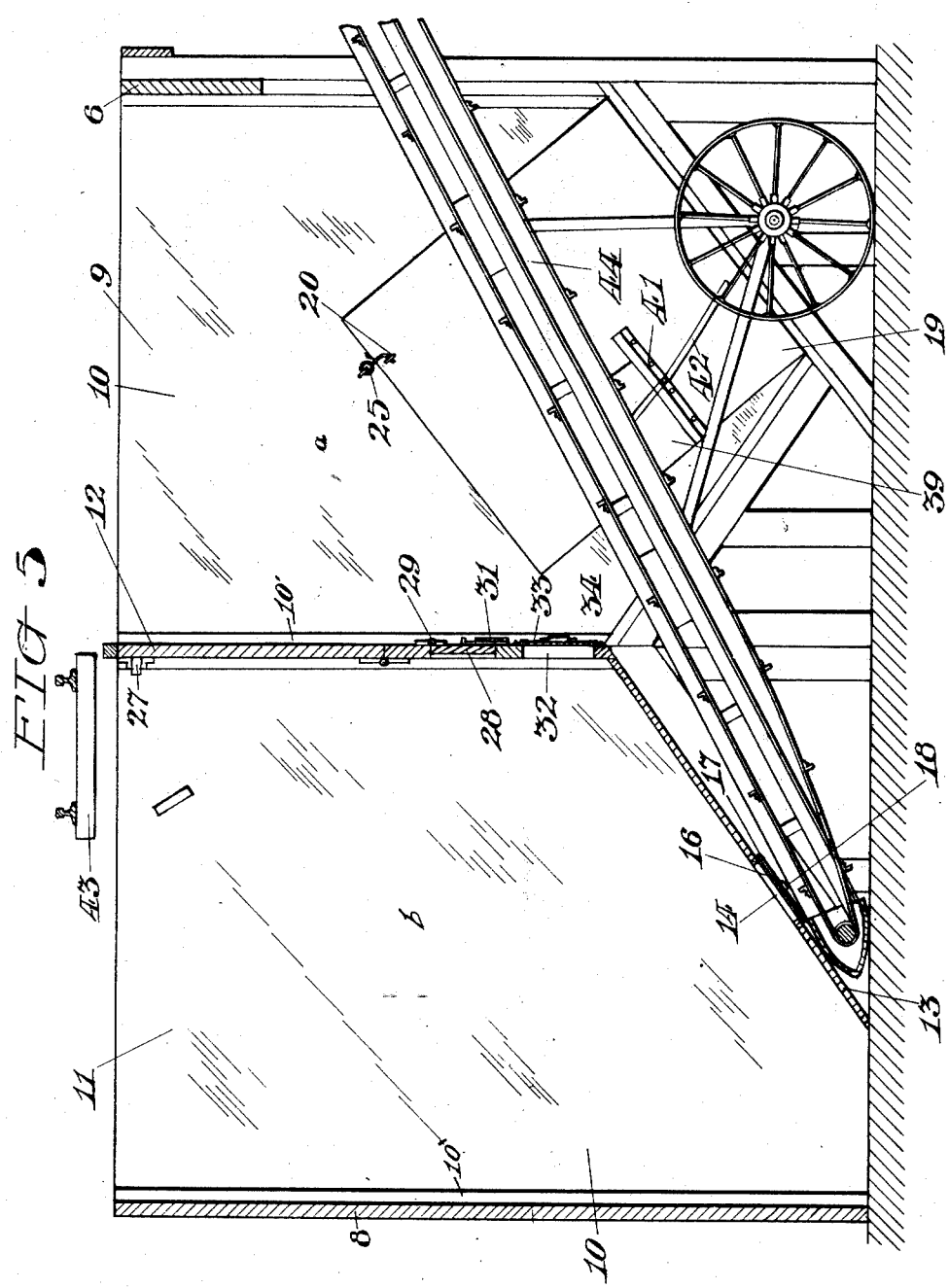

Patented Apr. 30, 1929.

1,711,053

UNITED STATES PATENT OFFICE.

WILLIAM J. GOURIE, OF PHILADELPHIA, PENNSYLVANIA.

STORAGE BIN.

Application filed October 3, 1927. Serial No. 223,563.

My invention relates to a storage bin.

The particular type of storage bin to which my invention relates is so constructed that the contents thereof are fed therefrom by gravity and sometimes known as a hopper.

The primary object of the invention is to provide a multiple compartment storage bin for conserving yard space.

An additional object of my invention is to provide a storage bin with separate compartments for storing various materials, or materials of graduated sizes including means for withdrawing materials from any desired compartment.

Another object of my invention is to provide means for selectively filling the said compartment without moving the supply means.

Another object of my invention is to provide a storage bin having front and rear compartments and having means for withdrawing the material from the rear compartment when the front compartment is filled.

Another object of my invention is to provide a storage bin having front and rear compartments providing means for admitting a part of the contents of the rear compartment to the front compartment.

Another object of my invention is to provide a storage bin having front and rear compartments for materials of graduated sizes, or different materials, and so arranged that yard space may be conserved in the withdrawal of material from either compartment from one side of the bin.

Another object of my invention is to provide a storage bin having front and rear compartments, each compartment adapted to be subdivided into sections and having means for selectively withdrawing the materials from any desired section.

Another object of my invention is to provide a storage bin having a plurality of sections containing graded or different materials and in which a conveyor may be used for conveying the materials of any section to a vehicle for loading the same or to any other point desired.

Other objects and advantages of my improved bin will be manifest to those skilled in the art, to which this invention appertains, by reference to the following description when considered in connection with the accompanying drawings in which:

Figure 1 is a top plan view of a unit of my improved bin and shows a subdivided front compartment and a subdivided rear compartment, Figure 2 is a cross-sectional view of the bin on the line 2—2 of Figure 1 looking in the direction of the arrows, Figure 3 is a front view of the same, Figure 4 is a cross-sectional view of a complete bin taken at a point indicated by the line 4—4 of Figure 2 and looking in the direction of the arrows thereon, and Figure 5 is a rear view similar to Figure 2 and shows a conveyor in position to receive material from the rear compartment.

My improved supply bin is adapted to provide storage for graduated materials, such for instance, as lump coal, egg coal, nut coal and slack, or for different materials, such for instance, as those used in the building trade, viz, crushed stone, sand and gravel, or may be used for any purposes wherein it is desired to separately store the materials and to selectively discharge the same as required.

Figure 1 shows a complete unit of my invention which is provided with a front wall 6, side walls 7 and rear wall 8.

A number of these units may be placed side by side, as shown in Figure 1, but in describing the invention one unit only will be referred to.

The unit is provided with a front compartment 9 and a rear compartment 11 separated by the intermediate partition wall 12, and these compartments may be subdivided by means of the partition 10 whose ends fit into the channels 10′ into sections "a"—"a" and "b"—"b". Each section "a" has a section "b" directly behind it.

The rear wall as shown in Figure 2 extends to the ground, and the front wall and intermediate partition wall 12 terminate a considerable distance above the ground to provide for a bottom chute as later explained.

Extending backward from the bottom of intermediate partition wall 12 in each section "b" is an inclined bottom wall 13 whose lower end rests upon the ground and is provided with an opening 14 thereon which is normally closed by means of a gate 16 which is slidably mounted in Z-shaped slideways 17. This door is operated by means of a pivotally mounted lever 18 for opening and closing the same.

The bottom of each of the sections "a" comprising the compartment 9 is formed by a front gate 19 and a rear gate 21 to constitute a chute. These gates, when in normal position, have their upper end coinciding with the bottoms of the front wall 6 and intermediate partition 12, respectively, and extend downward and toward each other where they meet to form a V-shaped chute for each section.

These gates are provided with hinges 22 which are affixed to said gates and to the partition 10 and side walls 7, respectively, so that the said gates may be raised when desired.

These gates 19 and 21 are provided with eyelets 20 adapted to be engaged by hooks 25 to hold them in their raised position, as shown in Figure 5.

The front wall 6 is provided with a vertical gate 23 which is connected by the hinge 24 to the side wall 7 so that the same may be swung inward and against said side wall when desired.

A hinged gate 26 is provided on the intermediate partition wall 12 and on each side of the partition 10 which is normally held in vertical position by means of a latch 27 and may be lowered to the position shown by the dotted lines in Figure 2 by releasing the said latch.

The partition 12 is also provided below the door 26 with a long door 28 on each side of the partition 10 and of the same width as the slide 26, and this door is provided with hinges 29 to permit it to be swung outward and into the section "a" and with a latch 31 for holding the same in its closed position.

Below each door 28 the partition 12 is provided with an opening 32 which is normally closed by a gate 33 held in place by the Z-shaped slides 34 and slidably removable therefrom.

The front gate 19 is provided with an opening 36 for discharging material from the section "a" and is normally closed by a door, as hereinafter explained.

The gate 19 is also provided with an opening 35, and with Z-shaped slides 37 on the upper side of the gate and extending along two sides for receiving the flanges of a chute 38. The upper flanges of said chute are adapted to enter and be retained by the Z-shaped slides 34 when the gate 33 normally closing the opening is removed therefrom so that communication is established between rear section "b" of the compartment 11 and the front section "a" of the compartment 9.

The openings 35 and 36 have a common gate 39 which is mounted in Z-shaped slides 41 extending along the sides of said openings and operated by the lever 42, so that, downward pressure upon the said lever will raise the gate to uncover the opening 36 to permit discharge from the section "a", and upward pressure upon the said lever will lower the gate to uncover the opening 35 and thus permit material from the section "b" of the rear compartment 11 to be delivered from said opening 35.

Figure 2 shows the position for locating the railroad track 43 for selectively filling the front and rear compartments, as later described.

The chute 13 and the gates 19 and 21 are suitably supported so that the weight of the material in the sections of the bin can be properly supported and distributed without injury thereto.

The bottom of the front wall of compartment 9 is sufficiently above the ground or floor to permit access of a conveyor 44, such as shown in Figure 5, and the bottom of the V-shaped chute is sufficiently above the ground or floor to permit it to discharge into the receiving end of the conveyor. This permits discharge of material from the front compartment through the V-shaped chute, or from the rear compartment through chute 38. When the front compartment is empty, gate 23 may be opened, chute 38 removed, and the gates forming the V-shape chute swung upwardly, thus permitting the receiving end of the conveyor to be moved under the inclined bottom wall of the rear compartment and to receive material therefrom through opening 14, as shown in Figure 5.

If the two compartments are used for material of like kind and grade, chute 38 may be removed and there may be open communication between the compartments through partition 12.

When the adjacent sections of the compartments 9 and 11 contain the same material, in which case the chute 38 would not be used, and the compartment 9 has been emptied of its material and only a small additional amount is required, the latch 31 on the door 28 may be opened whereupon the pressure of the material in the section of the compartment 11 will open the door and material will be deposited in the compartment 9 and pass on to the conveyor.

The sections "a" and "b" of the compartments 9 and 11 may both be filled from a car standing on the track 43 without moving the car which delivers the material, or by placing another car on the same track. When it is desired to fill the rear compartment, gate 26 is retained in its upright position by the latch 27; when it is desired to fill the front compartment, the gate is lowered to the position shown in Figure 2 which diverts the material into said front compartment. The location of this track eliminates the necessity of providing tracks over each compartment.

Of course, the supply bin illustrated may be modified in various ways without departing from the invention herein described and hereafter claimed.

I claim:

1. A supply bin having front and rear compartments; a rearwardly inclined bottom wall in the rear compartment having a gate controlled discharge opening; hinged gates forming the bottom of the front compartment and meeting at their lower edges to form a V-shaped chute, one of the gates having a gate controlled discharge opening, the bottom of the chute being disposed sufficiently above the ground or floor to permit access of a conveyor, and the gates being adapted, when the front compartment is empty, to be swung upward to permit access of the conveyor to the rear compartment.

2. A supply bin having front and rear compartments; a swingable gate forming the lower part of the front wall of the front compartment; a rearwardly inclined bottom wall in the rear compartment having a gate controlled discharge opening; hinged gates forming the bottom of the front compartment and meeting at their lower edges to form a V-shaped chute, one of the gates having a gate controlled discharge opening, the bottom of the chute being disposed sufficiently above the ground or floor to permit access of a conveyor and the gates being adapted, when the front compartment is empty, and the gate in the front wall being swung inwardly, to be swung upward to permit access of the conveyor to the rear compartment.

3. A supply bin having front and rear compartments; a rearwardly inclined bottom wall in the rear compartment having a gate controlled discharge opening; hinged gates forming the bottom of the front compartment and meeting at their lower edges to form a V-shaped chute, one of the gates having a gate controlled discharge opening, the bottom of the chute being disposed sufficiently above the ground or floor to permit access of a conveyor, and the gates being adapted, when the front compartment is empty, to be swung upward to permit access of the conveyor to the rear compartment, and a closed chute leading from the rear compartment to the V-shaped chute.

In testimony whereof I have signed my name to this specification.

WILLIAM J. GOURIE.